(12) United States Patent
MacCall

(10) Patent No.: US 10,534,812 B2
(45) Date of Patent: Jan. 14, 2020

(54) SYSTEMS AND METHODS FOR DIGITAL ASSET ORGANIZATION

(71) Applicant: The Board of Trustees of the University of Alabama, Tuscaloosa, AL (US)

(72) Inventor: Steven L. MacCall, Tuscaloosa, AL (US)

(73) Assignee: THE BOARD OF TRUSTEES OF THE UNIVERSITY OF ALABAMA, Tuscaloosa, AL (US)

(*) Notice: Subject to any disclaimer, the term of this patent is extended or adjusted under 35 U.S.C. 154(b) by 743 days.

(21) Appl. No.: 14/971,463

(22) Filed: Dec. 16, 2015

(65) Prior Publication Data

US 2016/0171028 A1 Jun. 16, 2016

Related U.S. Application Data

(60) Provisional application No. 62/092,333, filed on Dec. 16, 2014.

(51) Int. Cl.
*G06F 7/00* (2006.01)
*G06F 16/78* (2019.01)
*H04L 29/08* (2006.01)
*G06F 16/28* (2019.01)
*G06F 16/2458* (2019.01)

(52) U.S. Cl.
CPC .......... *G06F 16/78* (2019.01); *G06F 16/2477* (2019.01); *G06F 16/285* (2019.01); *H04L 67/10* (2013.01)

(58) Field of Classification Search
CPC ......... G06F 17/30598; G06F 17/30705; G06F 17/3023; G06F 17/30309; G06F 17/30064; G06F 17/30551; G06F 16/285; G06F 16/35; G06F 16/2477; G06F 16/447
USPC .......................... 707/725, 737, 738, 746, 913
See application file for complete search history.

(56) References Cited

U.S. PATENT DOCUMENTS

| | | | | |
|---|---|---|---|---|
| 8,228,372 B2* | 7/2012 | Griffin | ................. | G11B 27/034 348/43 |
| 8,355,903 B1* | 1/2013 | Birnbaum | ............... | G06F 17/24 704/9 |
| 8,358,345 B1* | 1/2013 | Fiore | ....................... | H04N 5/76 348/157 |
| 8,798,401 B1* | 8/2014 | Johnson | .............. | G06F 21/6218 382/305 |

(Continued)

OTHER PUBLICATIONS

Lipsey, D., Looking Ahead to 2014: Trends in Digital Asset Management and Metadata, Optimity Advisors (2014), https://optimityadvisors.com/insights/blog/looking-ahead-2014-trends-digital-asset-management-and-metadata (accessed Mar. 28, 2018).

(Continued)

*Primary Examiner* — Alexandria Y Bromell
(74) *Attorney, Agent, or Firm* — Meunier Carlin & Curfman LLC

(57) ABSTRACT

Systems and methods are disclosed indexing digital content. The method may include receiving a plurality of pieces of digital content from a plurality of sources and identifying a time stamp associated with each piece of digital content. The method may also include associating the digital content together into groups based on the time stamps. Moreover, the method may include providing access to the associated digital content.

19 Claims, 11 Drawing Sheets

(56) References Cited

U.S. PATENT DOCUMENTS

| | | | | |
|---|---|---|---|---|
| 9,497,490 | B1* | 11/2016 | Smallwood | H04N 21/23418 |
| | | | | 707/707 |
| 9,526,991 | B2* | 12/2016 | Lockton | A63F 13/332 |
| | | | | 707/707 |
| 9,924,148 | B2* | 3/2018 | Bartlow | G11B 27/031 |
| | | | | 707/707 |
| 2006/0173985 | A1* | 8/2006 | Moore | G06F 19/325 |
| | | | | 709/223 |
| 2006/0198608 | A1* | 9/2006 | Girardi | G11B 27/034 |
| | | | | 386/231 |
| 2009/0089845 | A1* | 4/2009 | Akers | G11B 27/105 |
| | | | | 725/88 |
| 2009/0111582 | A1* | 4/2009 | Schuler | A63B 24/0021 |
| | | | | 463/42 |
| 2009/0138906 | A1* | 5/2009 | Eide | G06Q 30/0264 |
| | | | | 725/32 |
| 2011/0029635 | A1* | 2/2011 | Shkurko | G06F 17/248 |
| | | | | 709/217 |
| 2012/0027379 | A1* | 2/2012 | Thompson | H04N 5/76 |
| | | | | 386/241 |
| 2013/0188926 | A1* | 7/2013 | Rajagopalan | G11B 27/36 |
| | | | | 386/248 |
| 2013/0268620 | A1* | 10/2013 | Osminer | H04N 21/251 |
| | | | | 709/217 |
| 2014/0187334 | A1* | 7/2014 | Crossley | A63F 13/44 |
| | | | | 463/43 |
| 2014/0236953 | A1* | 8/2014 | Rapaport | G06Q 10/10 |
| | | | | 707/740 |
| 2015/0058780 | A1* | 2/2015 | Malik | G06F 3/0481 |
| | | | | 715/772 |
| 2015/0228309 | A1* | 8/2015 | Bartlow | G11B 27/031 |
| | | | | 386/278 |
| 2016/0098851 | A1* | 4/2016 | Wu | G06T 11/60 |
| | | | | 345/634 |
| 2018/0124162 | A1* | 5/2018 | Carroll | G06K 9/00536 |
| | | | | 707/707 |
| 2018/0270516 | A1* | 9/2018 | Dalbec | H04N 21/242 |
| | | | | 707/707 |
| 2018/0314758 | A1* | 11/2018 | Baker | G11B 27/34 |
| | | | | 707/707 |

OTHER PUBLICATIONS

Why Multi-Tenancy is Key to Successful and Sustainable Software-as-a-Service (SaaS), Cloudbook (2013), http://media.cloudbook.net/pdf/why-multi-tenancy-is-key-to-successful-and-sustainable-software-as-a-service-saas.pdf (accessed Mar. 28, 2018).

Bishoff, L., & Allen, N., Business Planning for Cultural Heritage Institutions, Council on Library and Information Resources (CLIR) Report 124 (2004).

Berthiaume, D., Forrester Wave for Digital Asset Management: Market Matures from Confusion to CXM (2012), http://www.cmswire.com/cms/digital-asset-management/forrester-wave-for-digital-asset-management-market-matures-from-confusion-into-cxm-015572.php (accessed Mar. 28, 2018).

One-to-One Principle, mediawiki page (2011), https://github.com/dcmi/repository/blob/master/mediawiki_wiki/Glossary/One-to-One_Principle.md (accessed Mar. 28, 2018).

CatDV Data Sheet, http://www.squarebox.com/wp-content/uploads/2017/05/About-CatDV.pdf (accessed Mar. 25, 2018).

CBS statcrew.com Website, http://www.statcrew.com/ (accessed Mar. 25, 2018).

* cited by examiner

AUBURN         VS  ALABAMA           DATE  29 NOV 75
STADIUM  LEGION FIELD - BISAM        ATTENDENCE  63500

FINAL TEAM STATISTICS

|  | ALABAMA -28 VISITORS | AUBURN -0 HOME TEAM |
|---|---|---|
| TOTAL FIRST DOWNS | 22 | 13 |
| RUSHING YARDAGE (NET) | 376 | 94 |
| PASSING YARDAGE (NET) | 54 | 50 |
| TOTAL OFFENSE | 430 | 144 |
| RETURN YARDAGE | 26 | 15 |
| PASSES COMPLETED/ATT'D/HAD INT./ | 3 - 7 - 0 | 6 - 15 - 1 |
| PASSES INTERCEPED BY | 1 | 0 |
| NUMBER PUNTS/ AVERAGE | 4 - 37.25 | 7 - 39.3 |
| FUMBLES/ FUMBLES LOST | 0 - 0 | 2 - 1 |
| TOTAL YARDS PENALIZED | 7 - 25 | 5 - 45 |
| FIRST DOWNS RUSHING | 16 | 8 |
| FIRST DOWNS PASSING | 3 | 3 |
| FIRST DOWNS PENALTY | 3 | 2 |
| YARDS LOST RUSHING | 4 | 34 |
| YARDS INTERCEPTIONS RETURNED | 10 | 0 |
| PUNTS BLOCKED BY | 0 | 0 |
| NUMBER PUNTS RETURNED | 4 | 3 |
| TOTAL YARDS PUNTS RETURNED | 16 | 15 |
| NUMBER KICKOFFS RETURNED | 1 | 4 |
| TOTAL YARDS KICKOFFS RETURNED | 23 | 118 |
| TOTAL RUSHING PLAYS | 60 | 45 |
| TOTAL PLAYS | 71 | 67 |

FINAL INDIVIDUAL FOOTBALL STATISTICS
ALABAMA     29 NOV 75     AUBURN

VISITORS — ALABAMA

| RUSHING | ATT'D | NET YARDS | FOR TD | LONG RUN |
|---|---|---|---|---|
| DAVIS | 18 | 98 | 2 | 13 |
| TODD | 12 | 90 |  | 33 |
| FRALAY | 3 | 60 |  | 44 |
| SHELBY | 9 | 49 |  | 24 |
| CULLIVER | 6 | 31 |  | 21 |
| BOLES | 5 | 30 |  | 9 |
| STOCK | 2 | 14 |  | 11 |
| WATSON | 1 | 4 |  | 14 |
| CAVAN | 3 | 3 |  | 3 |
| CROWE | 2 | 0 |  | 0 |
| TOTALS |  |  |  |  |

| PASSING | ATT-COMPL.-H.I. | YARDS | FOR TD | LONG PASS |
|---|---|---|---|---|
| TODD | 7-3-0 | 54 | 2 | 27 |
| TOTALS | 7-3-0 | 54 | 2 | 27 |

| PASS RECEIVING | NO. | YDS. | FOR TD | LONG REC'N |
|---|---|---|---|---|
| NEWSOME | 2 | 37 | 1 | 27 |
| BROWN | 1 | 17 | 1 | 17 |
| TOTALS | 3 | 54 | 2 | 27 |

| PUNTING | NO. | YARDS | AVG. | LONG PUNTS |
|---|---|---|---|---|
| NELSON | 3 | 122 | 40.67 | 46 |
| TODD | 1 | 27 | 20.0 | 27 |
| TOTALS | 4 | 149 |  |  |

| ALL RETURNS | PUNTS NO.-YDS. | KICKOFFS NO.-YDS. | INTE'NS NO.-YDS. |
|---|---|---|---|
| SHELBY | 4-16 | 1-23 | - |
| KING | - | - | 1-10 |
| TOTALS | 4-16 | 1-23 | 1-10 |

HOME TEAM — AUBURN

| RUSHING | AWA | NET YARDS | FOR TD | LONG RUN |
|---|---|---|---|---|
| BURKS | 13 | 55 |  | 13 |
| GARGIS | 11 | 23 |  | 7 |
| MCINTYRE | 14 | 19 |  | 7 |
| BAUMGARTNER | 5 | 5 |  | 3 |
| HENLEY | 1 | 0 |  |  |
| BECK | 1 | 0 |  |  |
| TOTALS |  |  |  |  |

| PASSING | ATT-COMPL.-H.I. | YARDS | FOR TD | LONG PASS |
|---|---|---|---|---|
| GARGIS | 6-2-1 | 17 |  | 9 |
| BAUMGARTNER | 9-4-0 | 33 |  | 11 |
| TOTALS | 15-6-1 | 50 |  | 11 |

| PASS RECEIVING | NO. | YDS. | FOR TD | LONG REC'N |
|---|---|---|---|---|
| GILLIGEN | 4 | 38 |  | 11 |
| HENLEY | 1 | 7 |  | 7 |
| BURKS | 1 | 5 |  | 5 |
| TOTALS | 6 | 50 |  | 18 |

| PUNTING | NO. | YARDS | AVG. | LONG PUNTS |
|---|---|---|---|---|
| BAUMGARTNER | 7 | 275 | 39.3 | 49 |
| TOTALS | 7 | 275 | 39.3 | 49 |

| ALL RETURNS | PUNTS NO.-YDS. | KICKOFFS NO.-YDS. | INTE'NS NO.-YDS. |
|---|---|---|---|
| MCINTYRE | 2-7 | 2-62 | - |
| WARD | 1-8 | - | - |
| BECK | - | 2-56 | - |
| TOTALS | 3-15 | 4-118 | 0-0 |

PAGE 1　　　　　　　FIRST QUARTER　　　　　　ALA. AT AU　　NOV. 29, 1975. LEGION FIELD
WEATHER:　　72 DEGREES, WIND SE REL. NUM 42 % WIND SPEED 7 MPHS
BERREY OF ALA KO TO AU THRU THE END ZONE, NO RETURN
AU AT A20 AT 15:00
1-10-A20　　　MCINTYRE RT NO GAIN-RHODES　　　　　　　　14:47
2-10-A20　　　BURKS LT 3 TO A23-COLK　　　　　　　　　　　14:05 FUMBLE, AU RECOVERS
3-7-A23　　　 BURKS RE 13 TO A36-PIZZITOLA　　　　　　　　13:34 & 1ST DOWN
1-10-A36　　　MCINTYRE C 3 TO A39-BAUMHOWER　　　　　　　13:05
2-7-A39　　　 GARGIS RE 3 TO A42-C RL HARRIS　　　　　　　12:30
3-4-A42　　　 BURKS RE 2 TO A45-RHODES　　　　　　　　　　11:56
4-1-A45 BAUMGARTNER PUNTS TO SHELLEY-NO CATCH, DOWNED BY CATROWALD (33 YD PUNT)
　　　　　　AT ALA & 23
　　ALA AT ALA33 AT 11:28
　　　1-10-ALA23　　SHELBY RE MINUS 1-PITTS　　　　　　　　11:12
　　　2-11-ALA22　　TODD RT FUMBLES-TELHIARD ON TACKLE 4 YD GAIN-ALA RECOVER
　　　3-7-ALA26　　 TODD-BROWN PASS INCOMPLETE　　　　　　　9:35
　　　4-7-ALA26　　 NELSON PUNTS TO NEAL AT A1 RETURNS TO 37(43 YD PUNT-6 YD RETURN-)
　　　　　　　　　 HARRIS
AU AT A37 AT 8:45
1-10-A37　　　MCINTYRE RT 1 TO A38-HARRIS　　　　　　　　 8:32
2-9-A38　　　 GARGIS-GILLIGAN PASS COMPLETE 9 TO A7　　　 8:04 & 1ST DOWN
1-10-A47　　　GARGIS LE 2 TO A49-HANNAH　　　　　　　　　 8:40
2-8-A49　　　 MCINTYRE RE 2 TO ALA49-MONTGOMERY　　　　　 8:15
3-6-ALA49　　 GARGIS ATT. TO PASS-MINUS 2 TO A49-BAUNHOWER AT  7:32
4-8-A49　　　 BAUMGARTNER PUNTS TO SHELBY AT ALA 16 (36 YD PUNT-1 YD RETURN)-GILLIGAN
　　ALA AT ALA16 AT 7:04
　　　1-10-ALA16　　DAVIS RT 3 TO ALA19-CANDARA　　　　　　 6:53
　　　2-7-ALA19　　 DAVIS LT 12 TO ALA31-HAGAN　　　　　　　6:25 & 1ST DOWN
　　　1-10-ALA31　　STUCK LT 11 TO ALA 42-CUNNINGHAM　　　　5:58 & 1ST DOWN
　　　1-10-ALA42　　DAVIS RG 8 TO 50 -TELHIARD　　　　　　　5:26
　　　2-2-50　　　　TODD-NEWSOME PASS INCOMPLETE BUT 15 YD PENALTY ON
　　　　　　　　　 AU FOR PASS INTERFERENCE :　　　　　　　 5:00
　　　1-10-A35　　　DAVIS LG 112 TO A24-CUNNINGHAM　　　　　4:40 & 1ST DOWN
　　　1-10-A24　　　TODD ATT, TO PASS IS MINUS-PITTS AT 4:19 BUT DELAY OF GAME
　　　　　　　　　 AGASINT ALS. AT A28
　　　1-15-A28　　　DAVIS LT 3 TO A25-TELHIARD, LALLOCK　　 3:50
　　　2-12-A25　　　SHELBY RE ON PITCH 8 TO A17-STANALAND AT  3:13
　　　3-4-A7　　　　TODD-BROWN PASS COMPLETE 17 YDS PER TOUCH DOWN AT 2:49 & 1ST DOWN
　　　　　　　　　 DRIVE OF 84 YDRS IN 10 PLAYS
　　　　　　　　　 I'LL BY RIDNERY IS GOOD ALA 7 AT 2:47
BERREY OF ALA KO TO AU BECK ON 3 RETURNS TO A23 (20 YD RETURN)-BERREY-DUNCAN
A11 AT A23 AT 2:43
1-10-A23　　　MCINTYRE RT 5 TO 28-HARRIS　　　　　　　　　2:32
2-5-A28　　　 BURKS LT 1 TO A29-LOWE　　　　　　　　　　　2:05
3-4-A29　　　 MCINTYRE LT 1 TO A30-COOK　　　　　　　　　 1:26
4-3-A30　　　 BAUMGARTNER PUNTS TO SHELBY AT ALA 32 (RETURNS TO 37)
　　　　　　　38 YD PUNT-NOCOLL.M 5 YD RETURN
　　ALA AT ALA 37 AT 0:52
　　　1-10-A37　　　TODD RE 4 TO ALA41-STANSLOUD　　　　　　0:35
　　　2-6-ALA41　　 GULLIVER RT 4 TO ALA 46　　　　　　　　 0:05

FIG. 4C

PAGE 2         SECOND QUARTER         ALA. AT AU.     NOV. 29, 1975. LEGION FIELD
ALA AT ALA46 AT 15:00
- 3-1-ALA46    BOLES LG 9 TO A45-SRDITH                  14:54 & 1ST DOWN
- 1-10-A45     BOLES LG 9 TO A36-SANDERS                 14:27 &
- 2-1-A36      BOLES RG 6 TO A30-TELHIARD                14:07 & 1ST DOWN
- 1-10-A30     CULLIVER LG 2 TO A28-LAROCK               13:34
- 2-8-A28      CULLIVER LE 18 YD GAIN, BUT ALA, PEN. 15 FOR CLIP TO AU38
- 2-18-A38     BOLES RG 3 TO A35-TELHIARD                12:59
- 3-15-A35     TODD-BROWN PASS INCOMPLETE, BROKEN UP BY SANDERS
- 4-15-A35     TODD PUNTS TO GLENN WARD AT A8 RETURNS TO A19 (27 YD PUNT)-
               11 YD RETURN-TAYLOR

AU AT A19 AT 12:20
- 1-10-A19     MCINTYRE LT FUMBLES FOR GAIN OF 4 TO A23-OSTROWSKI. RECOVERS AT 11:55
- 2-6-A23      MCINTYRE RT 7 TO A30-PIZZATOLA AT 11:33 & 1ST DOWN
- 1-10-A30     BURKS RT 5 TO A35-HARRIS                  11:01
- 2-5-A35      MCINTYRE LOSES HIS WAY-MINUS 9 TO A26-HARRIS    10:20
- 3-14-A26     AU PENALIZED 5 FOR DELAY OF GAME TO A21   9:54
- 3-19-A21     GARGIS PASS BATTED DOWN BY HARRIS-SCREEN PASS   9:38
- 4-18-A21     BAUMGARTNER PUNTS TO SHELBY WHO FUMBLES AT ALA 32-MINUS 6
               ON RETURN(49 YD PUNT)

ALA ON ALA 24 AT 9:27
- 1-10-ALA24   TODD RG 5 TO 29-PHAGAN                    9:12
- 2-5-ALA29    CULLIVER LT 2 TO ALA 31-SANDERS           8:36
- 3-3-ALA31    TODD LE 1 TO ALA 32-PHAGAN                8:05
- 4-2-ALA32    NELSON PUNTS TO NEAL AT AU 22-NO RETURN (46 YD PUNT) 7:41

AU AT A22 AT 7:41
- 1-10-A22     BURKS LE 5 TO A27-MONTGOMERY              7:34
- 2-5-A27      HENLEY RG NO GAIN-WHITE                   7:25
- 3-5-A27      BURKS LT 10 TO A37-WHITE                  6:48 & 1ST DOWN
- 1-10-A37     BECK LE NO GAIN-KING                      6:09
- 2-10-A37     GARGIS-GILLIGAN PASS INCOMPLETE           5:44
- 3-10-A37     GARGIS-HENLEY PASS INCOMPLETE             5:39 KING COVERS
- 4-10-A37     BAUMGARTNER PUNTS TO SHELBY (49 YDS) RETURN OF 16 YDS

ALA AT ALA 30 AT 5:25
- 1-10-ALA30   DAVIS C 4 TO ALA34-SMITH, STANALAND       5:08
- 2-7-ALA34    SHELBY RT 2 TO ALA 36-EDDINA              4:49
- 3-10-ALA36   DAVIS C 2 TO ALA 38-HART                  4:17
- 4-10-ALA38   NELSON PUNTS TO NEAL AT A29 NO RETURN (33 YD PUNT) 3:53

AU AT A29 AT 3:53
- 1-10-29      GARGIS ATT. TO PASS IS MINUS & 7 TO A23-DUNCAN    3:27
- 2-17-A23     GARGIS-GILLIGAN PASS COMPLETE 2 TO A29-KING/ALA PAN. 15 PERS FOUL TO A46 AT
               3:07 & 1ST DOWN
- 1-10-A46     GARGIS RE 11 TO ALA 43-BAUMHOWER          2:37 & 1ST DOWN
- 1-10-A43     GARGIS ATT. TO PASS MINUS 5 TO ALA A8-BAUMHOVER AT 2:15 BALL STARTED ALA43
- 2-15-ALA48   MCINTYRE C NO GAIN-WHITE                  1:49
- 3-15-ALA48   MCINTYRE RT 1 TO ALA 47-DUNCAN            1:10
- 4-2-ALA47    BAUMGARTNER PUNTS DEAD AT ALA 9 (38 YD PUNT)-MCCOLLUM DOWNED IT

ALA AT ALA 9 AT 0:41
- 2-4-ALA15    ALA. PENALIZED 5 FOR DELAY OF GAME TO ALA 10
- 2-9-ALA10    TODD FELL ON BALL

SCOR: ALA 7 AU 0
END OF SECOND (QUARTER)

FIG. 4D

QUCIK FOOTBALL STATS
QUICK HALFTIME AND AFTER GAME REPORTS OF VITAL TEAM STATISTICS AND INDIVIDUAL LEADERS
(APPROVED WIRE SERVICES FORM)

[HALFTIME] ⟵================ CIRCLE ONE ====29 NOV 75====⟶ FINAL

| TEAM STATISTICS | ALABAMA -7<br>VISITORS | AUBURN -0<br>HOME TEAM |
|---|---|---|
| FIRST DOWNS | 7 | 6 |
| RUSHING YARDAGE AFT./NET YDS. | 24 - 118 | 26 - 57 |
| PASSING YARDAGE | 17 | 17 |
| TOTAL OFFENSE | 135 | 74 |
| *RETURN YARDAGE (NET) | 16 | 15 |
| PASSES (ATT.-COMP.-HAD INTE'D) | 3 - 1 - 0 | 5 - 2 - 0 |
| PUNTS (NUMBER-AVERAGE) | 4 - 37.25 | 6 - 40.75 |
| FUMBLES-FUMBLES LOST | 0 - 0 | 1 - 0 |
| PANELITIES-YARDS PENALIZED | 4 - 40 | 2 - 20 |

*RETURNS OF PUNTS, INTERCEPTED PASSES AND FUMBLES (NOT KICKOFFS).

INDIVIDUAL LEADERS

ALABAMA — VISITORS

| RUSHING | ATT'D | NET YARDS | FOR TD | LONG RUN |
|---|---|---|---|---|
| DAVIS | 7 | 44 | | 12 |
| BOLES | 4 | 27 | | 9 |
| SHELBY | 4 | 15 | | 8 |
| TODD | 5 | 12 | | 5 |

| PASSING | ATT-COMPL.-H.I. | YARDS | FOR TD |
|---|---|---|---|
| TODD | 3 - 1 - 0 | 1 | 17 |

| PASS RECEIVING | NO. | YDS. | FOR TD |
|---|---|---|---|
| DAVIS | 2 | 12 | |

| PUNTING | NO. | AVG. | LONG PUNTS |
|---|---|---|---|
| NELSON | 3 | 40.67 | 46 |
| TODD | 1 | 20.0 | 27 |

AUBURN — HOME TEAM

| RUSHING | ATT'D | NET YARDS | FOR TD | LONG RUN |
|---|---|---|---|---|
| BURKS | 7 | 40 | | 13 |
| MCINTYRE | 11 | 15 | | 7 |
| GARGIS | 6 | 2 | | 11 |

| PASSING | ATT-COMPL.-H.I. | YARDS | FOR TD |
|---|---|---|---|
| GARGIS | 5 - 2 - 0 | 17 | 0 |

| PASS RECEIVING | NO. | YDS. | FOR TD |
|---|---|---|---|
| GILLIGEN | 2 | 7 | 0 |

| PUNTING | NO. | AVG. | LONG PUNTS |
|---|---|---|---|
| BAUMGARTNER | 6 | 43.75 | 49 |

*FIG. 4E*

PAGE 3  THIRD QUARTER  ALA. AT AU. LEGION FIELD, NOV. 29, 1975
O*DONOGHUE OF AU KO TO ALA SHELBY IN END ZONE RETURN TO ALA23-O*DONOGHUE
    ALA AT ALA23 AT 14:52
        1-10-ALA23    TODD RT FUMBLES, RECOVERS FOR 8 YDS TO ALA31 AT 14:17
        2-2-ALA31    SHELBY C 2 TO ALA 33-LAROCK    13:52 & 1ST DOWN
        2-1-ALA33    DAVIS C 3 TO ALA 36-TELHIARD    13:22
        2-7-ALA36    DAVIS RG 13 TO ALA49-CUNNINGHAM    13:03 & 1ST DOWN
        1-10-ALA49    DAVIS LG 8 TO A48-SMITH, LAROCK    12:35
        2-2-ALA44    SHELBY C 1 TO ALH42-SMITH    12:07
        3-ALA42    SHELBY C 1 TO AWA41-CUNNINGHAM    11:44 & 1ST DOWN
        1-10-ALA41    DAVIS C 4 TO A37-PITTS    11:19
        2-7-ALA38    DAVIS RG 5-TO A33-TELHIARD    10:52
        3-2-ALA33    TODD RT 33 YDS FOR TOUCHDOWN    10:26
                      DRIVE OF 77 YDS IN 10 PLAYS
                      PAT BY RIDGEWAY IS GOOD    SCORE: ALA 14 AU 0
BERREY OF ALA KO TO AU BECK IN END ZONE RETURN TO IN A36 OF RETURN STEPPED OUT OF BOUNDS
AU AT A36 AT 10:18
1-10-A36    GARGIS RE 7 TO A43-PIZZATOLA    10:02
2-3-A43    GARGIS LG 5 TO A48-MONTGOMERY    9:35 & 1ST DOWN
1-10-A48    BURKS LE 6 TO ALA46-HARRIS    9:06
2-4-ALA46    MCINTYRE LT 3 TO ALA43-LOWE    8:34
3-1-ALA43    GARGIS SNEAKS 4 TO ALA39-MONTGOMERY    8:21 & 1ST DOWN
1-10-ALA39    GARGIS RE 1 TO ALA38-WHITE    7:47
2-8-ALA38    GARGIS PASS INCEPT ON ALA34 BY KING-GILLIGAN ON TACKLE-RETURN 10 TO ALA44
            AT 7:26 COOK TIPPED GARGIS* PASS
    ALA AT ALA 16 AT 7:04
        1-10-ALA44    DAVIS LG 10 TO A46-NEAL    7:12 & 1ST DOWN
        1-10-A46    DAVIS LG 3 TO A43-SANDERS    6:50    TIMEOUT: AU AT 6:39
        2-7-A23    TODD LE 16 TO A27    6:31 & 1ST DOWN
        1-10-A27    DAVIS LT 2 TO A25-SMITH    6:20
        2-8-A25    DAVIS LG 5 TO A20    5:53    TIMEOUT: AU AT 5:29
        3-3-A20    AU PEN. 5 TO 15 OFF SIDES    5:29 & 1ST DOWN
        1-10-ALA15    DAVIS C 1 TO A14-SMITH    5:11
        2-9-A14    TODD LT 14 YDS FOR TOUCHDOWN    4:53
                    DRIVE OF 56 YDS IN 7 PLAYS
                    PAT BY RIDGEWAY IS FOOD    SCORE: ALA 21 AU 0
BERREY OF ALA KO TO AU NEAL ON A6 RETURN TO ALA 39-FAUST 55 YD RETURN
AU AT ALA39 AT 4:44
1-10-ALA29    GARGIS RT 4 TO A43-SANDERS    4:21
2-6-ALA35    MCINTYRE LE MINUS, FUMBLES, PIZZATOLA RECOVERS AT ALA 37- AT 3:59
    ALA AT ALA 37 AT 3:59
        1-10-ALA37    CULLIVER C NO GAIN-HERT    3:49 ACTUALLY LOST A YD TO 36
        2-11-ALA36    CULLIVER RT 5 TO 41-HERT    3:26/ALA PEN. 15 TO ALA24-HOLDING
        2-3-ALA24    CULLIVER LT 21 TO ALA 45-CURRINGHAM 3:06
        3-2-ALA45    CAVAN LE NO GAIN-CUNNINGHAM    2:25
        4-2-ALA45    TODD PUNTS FAKED AND GAINED 4 TO ALA49 1:59 & 1ST DOWN, CUNNINGHAM
        1-10-ALA49    TODD LT NO GAIN-PITTS    1:32
        3-10-ALA49    BOLES LT 3 TO A48-STANALAND    0:48
        4-7-A48    TODD PUNTS/FAKED AGAIN/BEELER TOOK HIM OUT FOR 3 YD GAIN NO 1ST DOWN
AU AT A45 AT 0:27
                    END OF THIRD (QUARTER)    FIG. 4F
                    SCORE: ALA 21 AU 0

PAGE 4　　　　　　　FOURTH QUARTER　　　　AUBURN VS. ALA., LEGION FIELD, NOV. 29, 1975

AU AT A48 AT 15:00

| | | |
|---|---|---|
| 2-7-A48 | BAUMGARTNER-HENLEY PASS COMPLETE ALA45-RHODES AT 14:45 & 1ST DOWN | |
| 1-10-ALA45 | BURKS LT NO GAIN-BUAMHOWER | 14:23 |
| 2-10-ALA45 | BURKS RT 2 TO ALA 43-HUBBARD | 13:38 |
| 3-8-ALA43 | BAUMGARTNER-GILLIGAN PACS COMPLETE FOR 10 13:13 & 1ST DOWN ON 33 | |
| 1-10-ALA33 | AU PEN. 5 TO A38 FOR DELAY OF GAME | 13:11 |
| 1-15-ALA38 | BAUMGARTNER-GILLIGAN PASS COMPLETE 11 TO ALA27-BAUMHOWER AT 12:46 | |
| 2-4-ALA27 | BAUMGARTNER LG 1 TO ALA 26-BEUMHOWER | 12:18 |
| 3-3-ALA26 | BAUMGARTNER RT 3 TO ALA23-TURPIN | 11:47 & 1ST DOWN |
| 1-10-ALA23 | BAUMGARTNER-BUTLER PASS INCOMPLETE, LOWE BROKE IT UP AT 11:29 | |
| 2-10-ALA23 | BAUMGARTNER ATT. TO PASS IS MINUS 5 TO ALA28-BAUMHOWER AT 11:20 | |
| 3-15-ALA28 | BAUMGARTNER-BURKS PASS INCOMPLETE | 10:40 |
| 4-15-ALA28 | O*DONOGHUE ATTEMPTS 44 YD FIELD GOAL & IT IS NO GOOD AT 10:32 INTO DND | |

ALA AT ALA23 AT 10:32

| | | |
|---|---|---|
| 1-10-ALA20 | TODD-NEWSOME PASS COMPLETE 10/BUT ALA RAN 5 TO 15 OFFSIDE AT 10:21 | |
| 1-15-ALA15 | SHELBY RE 24 TO ALA 39-NEAL | 10:15 & 1ST DOWN |
| 1-10-ALA39 | DAVIS LG 1 TO ALA40-PITTS | 9:41 |
| 2-9-ALA40 | TODD-HARRIS PASS COMPLETE 13 TO A48 | 9:12 & AU PEN. 15 TO A45 & 1ST DOWN PENALTY |
| 1-10-A45 | TODD-BROWN PASS INCOMPLETE 13 TO A48 | 8:48 NEAL DEFENDING |
| 2-10-A45 | SHELBY RT 6 TO A39-LAROCK | 8:32 |
| 3-4-A39 | TODD-NEWSOME PASS COMPLETE 10 TO A29-HILL AT 6:13 & 1ST DOWN | |
| 1-10-A29 | STOCK LT 3 TO A26-SELLERS | 7:50 |
| 2-7-A26 | CULLIVER LT 2 TO A24-SMITH | 7:15 |
| 3-5-A24 | TODD-NEWSOME PASS COMPLETE24 YDS FOR TOUCHDOWN AT 6:51 & 1ST DOWN | |
| XXXX | 80 YD DRIVE IN 9 PLAYS | |
| | PAT BY RIDGEWAY IS GOOD　　　SCORE: ALA 26 AU 0 | |

BERREY OF ALA KO TO AU NEAL ON 6 RETURN TO A13 A YD RETURN-TAYLOR AT 6:47

AU AT A13 AT 6:47

| | | |
|---|---|---|
| 1-10-A13 | MCINTYRE LT 3 TO A16-HARRIS | 6:32 |
| 2-7-A16 | BURKS ON DRAW NO GAIN-HARRIS | 6:11/BUT ALA PEN. 15 TO A31- LATE HIT - & 1ST DOWN |
| 1-1-A31 | BAUMGARTNER-BURK PASS COMPLETE 5 TO A36-HUBBARD | 5:45 |
| 2-5-A36 | BAUMGARTNER-GILLIGAN PASS INCOMPLETE | 5:23 |
| 3-5-A36 | BURKS RG 4 TO A41-MONTGOMERY | 5:15 |
| 4-1-A41 | BAUMGARTNER SNEAKS 1 TO A42-LOWE | 4:34 & 1ST DOWN |
| 1-10-A42 | BAUMGARTNER ATT. TO PASS IS MINUS TO A38-TURPIN AT 4:01 | |
| 2-14-A38 | BAUMGARTNER-MCCALL PASS INCOMPLETE | 3:37 |
| 3-14-AL38 | BAUMGARTNER-MCINTRYE PASS INCOMPLETE | 3:30 |
| 4-14-A38 | BAUMGARTNER PUNTS TO BOLDEN-FAIR CATCH (32 YD PUNT) | |

ALA AT ALA 30 AT 3:23

| | | |
|---|---|---|
| 1-10-ALA16 | CAVAN LG 3 TO ALA33-BELLEMY | 3:11 |
| 2-7-ALA19 | HENLEY LE 44 TO A23-BELLEMY | 2:31 & 1ST DOWN |
| 1-10-ALA31 | MATSON RG 4 TO A19-HERT | 2:03 |
| 2-10-ALA42 | FRELEY RE 9 TO A10-SANDERS | 1:42 & 1ST DOWN |
| 1-10-ALA31 | CAVAN C NO GAIN-LONG | 1:17 |
| 2-10-ALA42 | FRALEY RS 7 TO A3-SANDERS | 0:50 |
| 4-1-A1 | CROW C NO GAIN-SALLERS | 0:00 |

END OF FOURTH QUARTER

FINAL SCORE: ALABAMA 28 AUBURN 0　　　　FAREWELL TO CHUG, GREAT EVEN IN DEFEAT

FIG. 4G

SCORING AND SUBSTITUTIONS

BY QUARTERS

|         | 1 | 2 | 3  | 4 | F  |
|---------|---|---|----|---|----|
| ALABAMA | 7 | 0 | 14 | 7 | 28 |
| AUBURN  | 0 | 0 | 0  | 0 | 0  |

| TEAM | | PLAYER &YDS | DRIVE | PLAY | TIME | QTR. |
|------|------|-------------|-------|------|------|------|
| ALA | AU | | | | | |
| 7  | 0 | BROWN 17 YR PASS FROM TODD | 84 | 10 | 2:49 | (1) |
| 14 | 0 | TODD 33 YD RUN (RIDGEWAY KICK) | 77 | 10 | 10:26 | (2) |
| 21 | 0 | TODD 14 YD RUN (RIDGEWAY KICK) | 56 | 7 | 4:53 | (3) |
| 28 | 0 | NEWSOME 24 YD PASS FM. TODD (RIDGEWAY KICK) | 80 | 9 | 6:51 | (4) |

SUBSTITUTIONS

ALABAMA
OFFENSE
SE NEWSOME, HARRIS, FLANAGEN
QT LAZENBY, HANNAH
QG RUFFIN, CRYDER, SADLER
C JONES, SMITH
SG GERASIMSHUK, GREEN, D. MCINTYRE
QB TODD, RALEY, RUTLEDGE
LHB SHELBY, BOLES, CAVAN
SHB STOCK, TAYLOR
FB DAVIS, WATSON, CULLIVER
DEFENSE
LE TRUPIN, HARRIS
LT HANNAH
RT BAUMHOWER
RE COOK
SLB MONTGOMERY, DUNCAN
WLB LOWE, C. HUBBARD
LCB RHODES
RCB KING
PS BOLDEN
SP NELSON, BERREY, RIDGEWAY

AUBURN
OFFENSE
SE GILLIGAN, WOOD
LT OSTROWALD, R. JONES
LG TROTT, CHENAULT
C STRICKLAND, NETTLEMAN
RG EVANS
RT ABREN, A. JONES
TE BUTLER, SPIVEY, MCCALL
QB GARGIS, BAUMGARTNER
TB MCINTYREM HENLEY
BURKS, BECK, HARBUCK
VACARELLA, POWELL
DEFENSE
LT STANALAND, J. SMITH
LLS SELLERS
RLB LAROCK, LONG
RT TELHIARD, BELLEMY, HART
RE PITTS
SLB SANDERS, PHAGAN, HICKS
LSB HILL, BEELER, WARD
RSB NEAL, MCCLOUD
S CUNNINGHAM, FREEMAN
SP BAUMGARTNER, O*DONOGHUE

*FIG. 4H*

SYSTEMS AND METHODS FOR DIGITAL ASSET ORGANIZATION

CROSS-REFERENCE TO RELATED APPLICATIONS

This application claims the benefit of U.S. Provisional Patent Application No. 62/092,333, filed on Dec. 16, 2014, entitled "DIGITAL ASSET MANAGEMENT," the disclosure of which is expressly incorporated herein by reference in its entirety.

BACKGROUND

Many photographers are in the business of taking pictures of events, such as sporting events. With the increasing volume of images being created, a problem has arisen that it can be difficult to organize, store, and locate a particular image. A company or individual may want to find an image of their favorite player from a particular play. However, using a general internet search will return hundreds or possibly even more images of that player. The user will then have to sort through all of the images manually in an effort to locate a particular picture of a player on a given play and game. This takes a lot of time and can leave users frustrated at being unable to quickly locate their favorite picture.

Museums, libraries, and archives are also struggling under the weight of responsibility for the collecting, organizing, and preserving of digital materials ("digital assets"). In the modern era, these digital assets include massive amounts of born digital photographs and video footage. This situation is further complicated by the need to combine these more recent born digital assets with digitized historical assets such as those in the archive of museums so that there is a single digital asset repository rather than multiple "silos" of digital content within the organization. Tens of thousands of born digital still images and thousands of hours of born digital video are taken by even a group of photographers. Moreover, large amounts of historical documentation (images, video, and game data) from throughout much of the past century are held in archives in museums.

As a result, there is a need for digital asset management systems and methods that will index sports images for quick retrieval in a way that consolidates digitized historical and current "born digital" assets taken from games over time.

SUMMARY

Systems and methods are disclosed for indexing digital content. The method may include receiving a plurality of pieces of digital content from a plurality of sources and identifying a time stamp associated with each piece of digital content. The method may also include aggregating the digital content together into sets based on the time stamps of individual digital assets. Moreover, the method may include providing access to the associated digital content. The proposed system and method leverage the data generated by game statisticians that already exists about each game as an event. The disclosed systems and methods include a data transformation process that converts this game data into an organizing framework for individual digital assets that can be attached to individual game plays by way of their timestamps. In summary, the game event is organized and then the individual assets are attached, which produces a high quality digital asset organizing method that is more effective and efficient. The disclosed systems and methods are in contrast to a traditional asset-by-asset organization process, which results in creating individual metadata records for each digital asset that are made searchable with a digital asset management repository application. The traditional asset-by-asset organization process is time consuming, inefficient and often prone to errors.

BRIEF DESCRIPTION OF THE DRAWINGS

FIGS. 4A-4H illustrate examples of game data. FIG. 4A illustrates an exemplary game sheet from a game in 1975. FIG. 4B illustrates additional game data shown per player. FIGS. 4C, 4D, 4F, and 4G illustrate additional game data indexed regarding each game and play. FIG. 4E illustrates additional game data including average yardage for different types of plays, the long run for a particular player, and others. FIG. 4H illustrates additional player data.

DESCRIPTION

Disclosed are systems and methods for organizing digital assets. An organization, whether non-profit or for-profit, cannot maximize the value of its licensable sports digital assets, such as photos and video clips, if these assets are locked away in institutional repositories. Even more importantly, licensing fees for these digital assets cannot be maximized if these assets are not organized with end users in mind, specifically those end users who are content creators who are often external to these organizations. Disclosed is a method embedded within a system for a cloud-based digital asset aggregation service that provides a monetization channel for organizational repository content. The result is a clearinghouse service that provides aggregated access to the digital assets of multiple organizations so that content creators can incorporate these licensed digital assets into their consumer products, including network television replay packages, ebooks, apps, documentary filmmakers, and other digital products. These content creators benefit from a one-stop clearinghouse that conveniently consolidates licensed content across many organizations' repositories.

Figure 1:
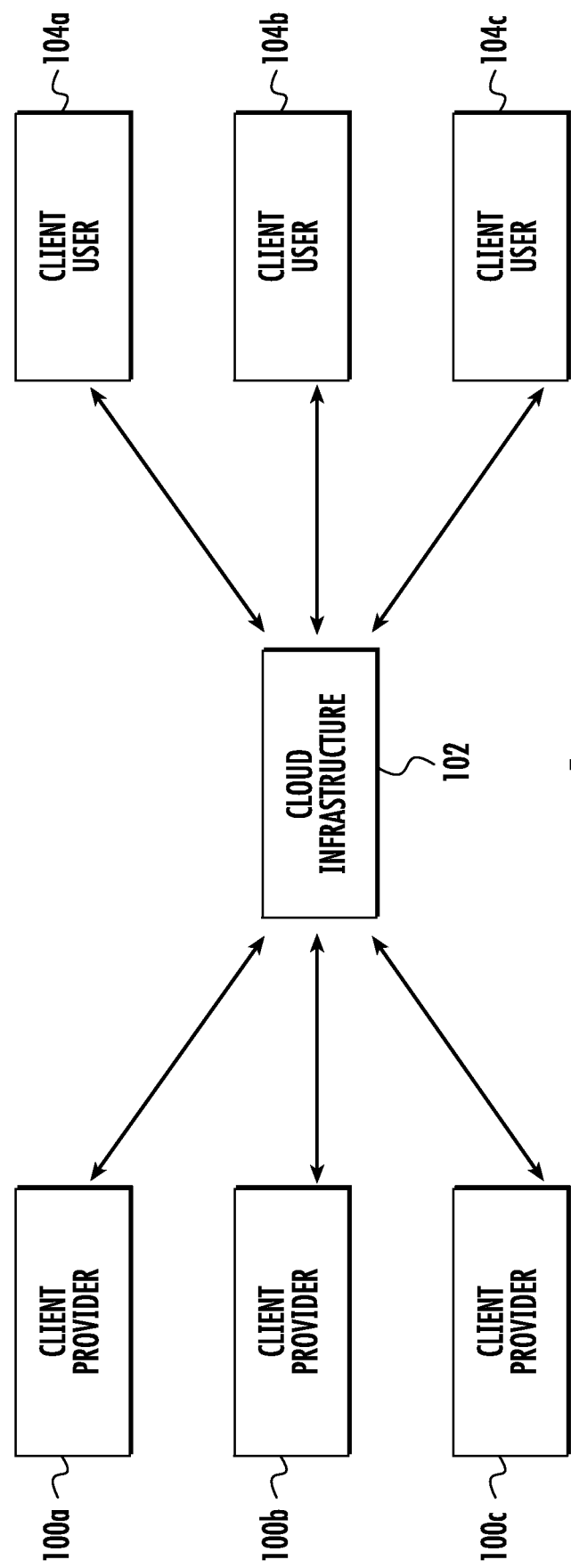
FIG. 1 illustrates an exemplary system for indexing and archiving digital content.

FIG. 1 illustrates an exemplary system diagram of a cloud-service that serves as a sports clearinghouse. The clearinghouse may be used by digital asset owners and digital content creators who seek to use those assets to create consumer products including those creators working at television networks, apps designers, documentary filmmakers, and others who create value from their creative use of digital assets. In addition, organizations, such as libraries and archives, which both supply content and who also support their own content creators within their own institutions, may use the system of FIG. 1 for image and video repository, indexing, and retrieval. The system protects the copyrights of all digital asset owners and tracks usage of individual digital assets to guarantee appropriate levels of contracted compensation.

Turning to FIG. 1, client providers 100*a-c* may provide digital content, including photographs, images, and video, for storage by cloud infrastructure 102. The images and video may be provided after an event, or during real-time while an event is ongoing. For example, images of a sports game may be uploaded to the cloud infrastructure 102 after a game has been completed or during real-time as the game progresses. In addition, archived images from a game that occurred previously, at any time in the past, may also be uploaded to cloud infrastructure 102. As a result, archived images from museums of historical sporting events may be moved to an online storage system that can index images and provide an easy search and retrieval technique for users. Client providers 100a-c may be, for example, photographers, news organizations, museums, or any other provider of digital content.

Cloud infrastructure 102 may include a plurality of computers with memory storage that is accessible over internet connections. When images, video, and other digital content are uploaded to cloud infrastructure 102, the content may be indexed and archived. Content from multiple sources may be aggregated and associated together to allow for easy retrieval. For example, images of a sporting event taken by different photographers may be associated together based on the event. The copyrights and ownership of the original content may be maintained so that all rights are preserved when the images, video, or other digital content is subsequently reproduced. Cloud-infrastructure 102 may be, in one embodiment, a multi-tenant cloud infrastructure. Additional details of indexing and aggregating digital content will be provided below with reference to FIG. 2.

The result of indexing and aggregating the digital content is a consistent view of the combined content that can be provided to client users 104a-c. Client users 104a-c may be, for example, individuals, digital content providers, museums, news organizations, or others. Although illustrated as different entities than client providers 100a-c, it will be appreciated that client users 104a-c may be the same entities as client providers 100a-c. Client users 104a-c may access the archived digital content, search for particular digital content with specificity, and access the digital content.

Figure 2:
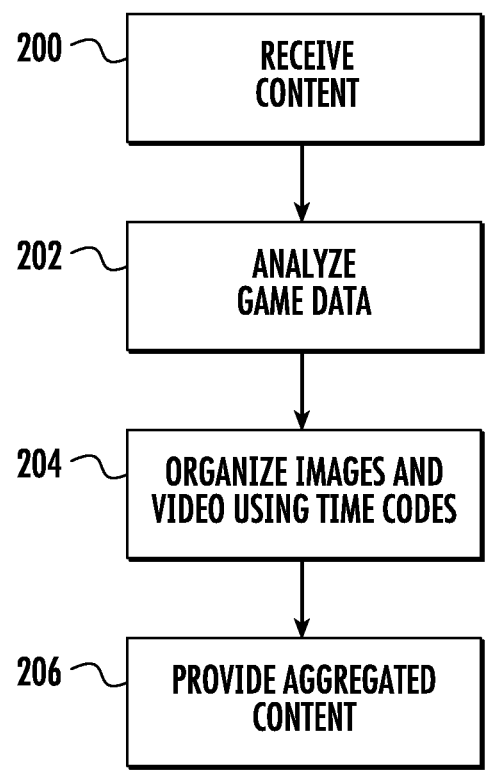
FIG. 2 illustrates an exemplary method for indexing and archiving digital content.

FIG. 2 illustrates an exemplary method for indexing and archiving digital content. At step 200, digital content may be received from a plurality of sources. Many photographers, video recorders, and other entities may upload digital content. The content may be, for example, pictures and video of multiple different sporting events taken at different times.

Next, at step 202, the cloud services provider analyzes game data as part of the process of indexing and archiving digital content. Game data can include a large amount of statistics about which players were on the field during plays, what each player did during the play, the results of individual plays and aggregated plays (e.g., a particular third down attempt in a football game and the aggregated results of all third down attempts in a game), significant game milestones such as scores or penalties, and a variety of other game data. A more detailed description of game data and the process of collecting game data will be provided below with reference to FIGS. 4A-H.

The cloud services provider can transform game data into a game-based organizing framework. Game data can include structured game data, which is game data including the start time and/or end time of each arbitrary length segment (e.g., a play), as well as any information or description related to the segment (e.g., play resulted in a first down, etc.). Structured game data can optionally be embedded in Extensible Markup Language (XML) files (or other data files), game data sheets (e.g., game data of FIGS. 4A-H), and/or historical records. This disclosure contemplates that in some implementations structured game data can be extracted (e.g., automatically or manually) when embedded in certain formats (e.g., game data sheets and/or historical records). For example, a user such as an archivist can automatically or manually convert game data sheets and/or historical records into XML files, for example. This can optionally be done by manual entry into a computer or through image scanning techniques that read paper game data sheets and scan it into electronic format as described herein, for example. XML files can include granular play-by-play descriptions in standardized formats. In addition, each XML file can include a start/end time data pair such as timestamps corresponding to the start and end of each play, respectively. Optionally, XML files can be generated using STAT CREW SOFTWARE of STAT CREW SOFTWARE, INC. of Cincinnati, Ohio running on a computer. In some implementations, XML files are created in real-time during a game. In other implementations, XML files are created following the end of a game from game sheets and/or historical records. This disclosure contemplates electronically capturing game data in other file formats using a computer, and XML files are provided only as one example file type. Alternatively or additionally, game data can optionally be captured manually. Similar to above, manually-captured game data can include granular play-by-play descriptions, as well as time data. Manually-captured game data includes handwritten game sheets (e.g., as shown by FIGS. 4A-4H). Alternatively or additionally, game data can optionally include historical accounts of a game. Historical accounts may lack granular play-by-play descriptions but such play-by-play information can be reconstructed (e.g., by librarians, archivists, etc.) into structured game data from the historical accounts as described above. This disclosure contemplates that manually-captured and/or historical game data can be converted to electronic form using techniques known in the art.

The cloud services provider can extract structured, time-based data from the game data to transform the game data into a game-based organizing framework. Additionally, the cloud services provider can identify time segments of arbitrary length (e.g., plays) within the game-based organizing framework. In other words, the cloud services provider can index the game data on a play-by-play basis, which creates the game-based organizing framework. The game-based organizing framework represents a time-location (e.g., time of day-stadium) index of the game data, which provides the framework for linking of digital assets. As described herein, digital assets can be linked to the game-based organizing framework. The game-based organizing framework can then be used for organizing digital assets. As discussed above, this is in contrast to the traditional asset-by-asset organization process, which results in the creation of metadata records for each piece of digital content. In other words, instead of indexing each piece of digital content through individual metadata records according to the traditional process, digital content (which can be received from a plurality of sources) can be linked to the game-based organizing framework. Alternatively or additionally, other sources of time-based data related to a game can be imported and integrated with the game-based organizing framework. This disclosure contemplates that the other sources of data do not need to be contained in the structured game data and/or in the digital assets. For example, other sources of data can include, but are not limited to, player participation records (e.g., collected automatically using video recognition), game statuses (e.g., quarters, scores, statistics, etc.), game reports, weather, location-based data, etc. The other sources of data can be linked to the game-based organizing framework using timestamps (e.g., linking the other sources of data at relevant times to the game-based organizing framework).

At step 204, the cloud services provider may organize the images and video using timecodes. As a result, the digital content may be organized by linking many different sports images and sports videos to games, which speeds up the total time taken for organizing and shrinking the production cycle. The result is a game-based framework for organizing digital content that may use codes from the society of motion picture and television (SMPTE) engineers. SMPTE codes may include, for example, a time code.

The timecodes may be provided as part of the images and video that was received at step 200. By associating images based on their timecodes, a user may go back and search for a particular event, such as a football game, based on the time that the event occurred. Images associated with that event may be provided to a user even though the images may have been captured by a plurality of different content providers.

In addition, users may quickly locate digital content for a particular piece of an event. For example, users may search for images and video content of a particular play in a football game based on when the play occurred. Unlike current practice in digital asset management, the digital sports images and video may be collected from across a range of client content providers and conveniently grouped for customers who need sports images and videos for their content-based products. As described in more detail below, each play can also be indexed along with additional metadata describing the type of play, result of play, players involved, and other game data. This allows a client user to search for plays based on given criteria, and the relevant video segments can be located and reproduced based on the timecodes.

Step 204 may therefore link individual digital images and video clips to time-points in games via SMPTE timecodes, which speeds up the total time taken for organizing and shrinks the production cycle for organizing. The result is a game-based framework for organizing all micro-events during a game, such as 60-yard touchdown passes, and then linking digital assets to each micro-event by way of SMPTE timecodes rather than having to create individual hand-crafted surrogates for each digital asset. With this organizing method, images and clips from across a range of clients may be aggregated and grouped for content creators based on the type of game micro-event of interest to them.

At step 206, the aggregated content may be provided to client users who are interested in accessing the images. The content may be provided over a standard Internet connection. In exemplary embodiments, the content may be provided according to a service agreement or on demand. For example, a news organization may enter a service agreement to receive access to indexed images and digital content taken from a plurality of different sources to sporting events. The content may maintain its copyright status and credit may be given to the original content provider for each image or video clip. Examples include using watermarks or notations on images or video of the copyright owner. As content is accessed by content users, the original content providers may be compensated for the right to reproduce their digital content.

The game-based organizing framework described herein can be useful for large-scale data analysis applications. For example, the game-based organizing framework can be used create a diachronic record. In particular, the game-based organizing framework records micro-contexts that occur within time segments of a game (e.g., the domain of interest). Within a game, the time segments can represent the plays, each of which can have an arbitrary length. Event-types that occur within the plays of a game (e.g., first downs, touchdowns, left-handed quarterback participation, concussions, etc.) form intra-game micro-context timelines of those event-types. An intra-game micro-context timeline includes a sequence of plays of which a particular micro-context (or particular micro-contexts) occurs within the same game, such as a timeline of every play with event-type "first down" that occurs in a given game. This disclosure contemplates that event-types are not limited to "first down" and can be any type of event within a game. The micro-context timeline approach facilitates the interoperability of data sources that enable aggregation or combination of micro-contexts across a plurality of games to form a comprehensive inter-game record. It should be understood that the plurality of games can be two or more games or even all games in the historical record. Respective intra-game micro-context timelines from a plurality of games can be aggregated by creating a sequence of a particular micro-context (or particular micro-contexts) occurring within the games. For example, an inter-game diachronic record of uniquely-identified time segments (e.g., specific types of plays) can be aggregated from respective, individual intra-game timelines. The specific types of plays can include, but are not limited to, plays that result in first downs, plays that result in touchdowns, plays involving left-handed quarterbacks, and plays resulting in concussions. It should be understood that an inter-game diachronic record can be generated for a predetermined period of time (e.g., between year X and year Y, before/after year Z, over the entire historical record). Inter-game diachronic records can be used by interested users (e.g., players, coaches, media, historians, etc.) for a variety of purposes. For example, an interested user can search for or request an inter-game diachronic record using micro-contexts including, but not limited to, weather, location, time of day, specific players, game status (e.g., time, score, quarter, series, etc.), or other micro-context for the purpose of analyzing a specific micro-context.

Figure 3:
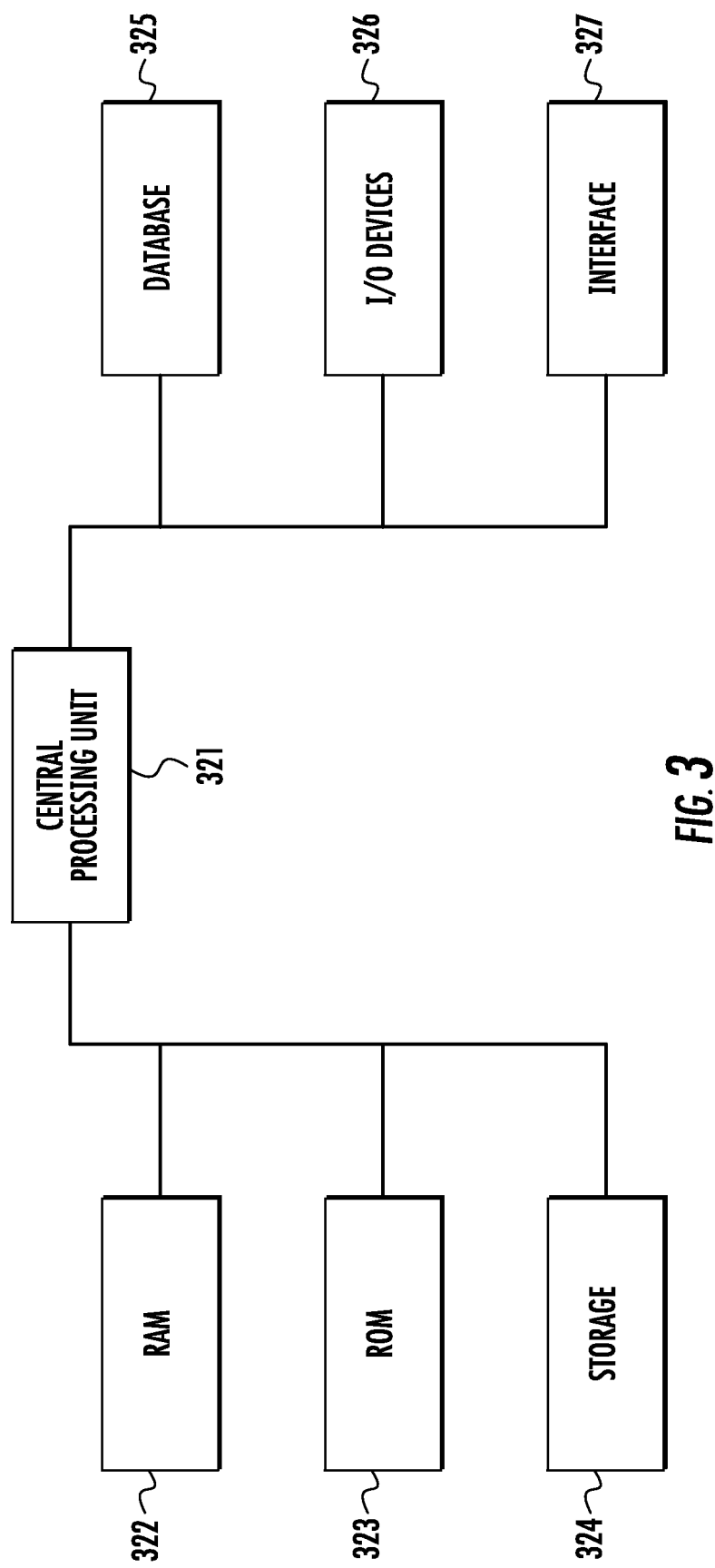
FIG. 3 illustrates an exemplary computer for indexing images.

FIG. 3 illustrates an exemplary computer for indexing images. The cloud infrastructure may include a plurality of computers. The computers may include one or more hardware components such as, for example, a central processing unit (CPU) 321, a random access memory (RAM) module 322, a read-only memory (ROM) module 323, a storage 324, a database 325, one or more input/output (I/O) devices 326, and an interface 327. Alternatively and/or additionally, controller 320 may include one or more software components such as, for example, a computer-readable medium including computer executable instructions for performing a method associated with the exemplary embodiments. It is contemplated that one or more of the hardware components listed above may be implemented using software. For example, storage 324 may include a software partition associated with one or more other hardware components. It is understood that the components listed above are exemplary only and not intended to be limiting.

CPU 321 may include one or more processors, each configured to execute instructions and process data to perform one or more functions associated with a computer for indexing images. CPU 321 may be communicatively coupled to RAM 322, ROM 323, storage 324, database 325, I/O devices 326, and interface 327. CPU 321 may be configured to execute sequences of computer program instructions to perform various processes. The computer program instructions may be loaded into RAM 322 for execution by CPU 321.

RAM 322 and ROM 323 may each include one or more devices for storing information associated with operation of CPU 321. For example, ROM 323 may include a memory device configured to access and store information associated with controller 320, including information for identifying, initializing, and monitoring the operation of one or more components and subsystems. RAM 322 may include a memory device for storing data associated with one or more operations of CPU 321. For example, ROM 323 may load instructions into RAM 322 for execution by CPU 321.

Storage 324 may include any type of mass storage device configured to store information that CPU 321 may need to perform processes consistent with the disclosed embodiments. For example, storage 324 may include one or more magnetic and/or optical disk devices, such as hard drives, CD-ROMs, DVD-ROMs, or any other type of mass media device.

Database 325 may include one or more software and/or hardware components that cooperate to store, organize, sort, filter, and/or arrange data used by controller 320 and/or CPU 321. For example, database 325 may store digital content, including video and images. It is contemplated that database 1525 may store additional and/or different information than that listed above.

I/O devices 326 may include one or more components configured to communicate information with a user associated with controller 320. For example, I/O devices may include a console with an integrated keyboard and mouse to allow a user to maintain a database of images, update associations, and access digital content. I/O devices 326 may also include a display including a graphical user interface (GUI) for outputting information on a monitor. I/O devices 326 may also include peripheral devices such as, for example, a printer for printing information associated with controller 320, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 327 may include one or more components configured to transmit and receive data via a communication network, such as the Internet, a local area network, a workstation peer-to-peer network, a direct link network, a wireless network, or any other suitable communication platform. For example, interface 327 may include one or more modulators, demodulators, multiplexers, demultiplexers, network communication devices, wireless devices, antennas, modems, and any other type of device configured to enable data communication via a communication network.

Reference will now be made to FIGS. 4A-H, which illustrate examples of game data. The game data of FIGS. 4A-H is one example of structured game data. Game data may be collected manually, through a conversion process, or automatically. With regard to manual collection, archived games may be watched or reviewed and the game data shown in FIGS. 4A-H collected for use by the system. The sheets shown in FIGS. 4A-H may also have been created during a game by announcers or other personnel. In that example, the data shown in FIGS. 4A-H, as well as other game data, can be converted from paper form into electronic form for use by the system in indexing and archiving images and video. The conversion process may be done by manual entry into a computer or through image scanning techniques that read paper game data sheets and scan it into electronic format. Automatic game data collection may also be used. For example, video recognition can be used to track the numbers on player's jerseys, and in that manner the location and participation of each player in each play can be tracked throughout games.

Modern play-by-play game data can be created electronically and made available for immediate use in real-time. This structured game data can be exported by any client provider using standardized formats, such as an XML file. Sports organizations may provide the standard format in which to provide data. For example, the NCAA can regulate the type of data exported by client providers and made available to cloud infrastructure 102. As a result, game data can be searched in real time to provide access to information by client users 104a-c. One example would be an unusual play, such as a triple-reverse in football. When video and associated metadata indicates that a triple-reverse just occurred in a live football game, client users 104a-c may request access to the replay or to other similar plays. Client users 104a-c can search based on the type of play (e.g., a triple reverse), and can further narrow their search based on a plurality of filtering parameters. Filtering parameters can include one or more micro-contexts as described above. Examples include the down (e.g., third down), the players involved, whether the game was at home or away, the weather conditions for a play, the result of the play, the team on offense, the team on defense, and other micro-context criteria including all of the data shown in FIGS. 4A-H. Because each play can be associated with timecodes, the content can be organized and located based on the searched criteria. In one embodiment, each play, beginning at a given timecode, can be indexed into databases at cloud infrastructure 102 using the criteria (e.g., micro-context criteria) discussed previously and shown in FIGS. 4A-H, such as players involved, the result of the play, the type of play, and others. Accordingly, the game-based organizing structure described herein enables a search process that can retrieve plays that meet the criteria of an event-type query (e.g., return all of the first down plays that is a pass play in the rain). The event-type query can be tailored to any metadata, micro-context criteria, event data, etc. that can be linked to the game-based organizing framework.

The cloud infrastructure therefore stores an indexed database with a plurality of video segments and images that are associated with micro-context criteria. Client users 104a-c can use any of a number of search criteria to locate relevant video and images. For example, a client user can search for all first down passes by a particular player. This allows players to study film prior to a game, reporters to locate relevant highlight video segments, research of game strategy, and real-time playback of relevant video segments. In this example, a search for first-down passes may result in hundreds of hits in the database of relevant video segments, each of which can be located and reproduced beginning at its associated timecode. Using filters, a client user may reduce the search result down to first down passes in excess of ten yards to return a subset of relevant video segments. While several examples have been provided, it will be appreciated that any game data can be used for indexing video and images, as well as for subsequently searching to retrieve video segments and images.

With reference to FIG. 4A, an exemplary game sheet from a game in 1975 is shown. In this game, Alabama had 22 first downs and Auburn had 13 first downs. The video segments beginning with each first-down play have timecodes and metadata indicating the play resulted in a first down. The metadata can include micro-contextual data about event-types occurring within the game. The metadata may provide an index or associated pointer into a database that correlates all of the timestamps for first downs with the associated result of the play, in this example, a first down. Other examples of micro-contextual data include rushing and passing yardage. Each offensive play has a timestamp associated with when the play began, and metadata indicates whether the play was a pass or a rush. Similarly, for the passes completed or passes that were incomplete, having a timestamp for the associated video segment and micro-contextual data allowing indexing and retrieval of video segments for complete passes allows a client user to quickly locate complete passes. In some embodiments, a stream of all complete passes can be automatically returned, so that a client user can view a stream of completed passes by a team or player.

In one embodiment, each play may be associated with a timestamp. As shown in FIG. 4A, plays that resulted in interceptions, punts, fumbles, and penalties will also be indexed using metadata that associates the relevant criteria (e.g., micro-contextual data) with the timestamp for the play. Plays resulting in a loss of yardage, a punt return, a kickoff or kickoff return, and other types of game data all can be used for indexing and archiving video segments beginning at the indicated timecodes.

FIG. 4B illustrates additional game data. In FIG. 4B, the game data is shown per player. For the plays that a player was involved in, the video segment and timecode can be linked to that player. This allows indexing and searching for video segments based on the player participation as a micro-context to further narrow search criteria. Further, a variable or metadata can be used to associate not only a player, but also the type of play a player was involved in. For example, running backs and a quarterback may be involved in both rushing and passing plays. FIG. 4B shows that the quarterback Todd has both rushing yards and passing yards. Micro-contextual data can include player participation and/or play type (e.g., rush or pass). By creating metadata for a play indicating the player involved and the type of play, a search can be narrowed to the type of play for a given player.

Although FIGS. 4A-H illustrate data for a single game, the data may be collated for a plurality of games. The date of the game can be used to specify searches within a particular game, but many users may also want to search across a plurality of games (e.g., to create an inter-game diachronic record as described herein), games in a given season, home or away games, and other criteria. Embodiments consistent with the disclosure include returning results in these and other scenarios, including video segments form multiple games returned in one or more video streams.

FIGS. 4C and 4D illustrate that additional data, including the weather, can also be indexed regarding each game and play. In addition, FIGS. 4C and 4D illustrate the time at which each play occurred in the first and second quarters, the type and result of the play (e.g., fumble, first down, touchdown), the player(s) involved, and other information. This information is an example of micro-contextual data. The time data may, in one embodiment, serve as the timecode to allow subsequent retrieval of video segments.

FIG. 4E illustrates additional game data. For example, the average yardage for different types of plays, the long run for a particular player, and others. This information is an example of micro-contextual data. Metadata relating to a particular player can therefore also be used to index video segments. In this example, a player's longest run can be indexed as metadata so that client users can search for a player's longest rush and receive a list of a video segment for the longest rush of a game, or video segments for a player's longest rushes over a plurality of games. FIGS. 4F and 4H are similar to FIGS. 4C and 4D, but include game data from the third and fourth quarters, respectively. The quarter can also be used as search criteria for retrieving relevant video segments and images. For example, a client user may only want to retrieve fourth quarter plays to review how a team performs toward the end of a game. FIG. 4H illustrates additional player data, including the time at which a particular play occurred, and substitutions which can track the players that entered and left a game.

It will be appreciated that many examples of game data that can be used for indexing video segments and images are shown in FIGS. 4A-H, but that the illustrated game data is exemplary. Additional game data for football games may also be collected. In addition, the disclosure also applies to any other sport, including basketball, baseball, hockey, soccer, and others. In the example of basketball, game data could include the play, type of play (e.g., a slam dunk, three pointer, free throw), penalties, injuries, a player who provided an assist, the scoring player, and others. Each sport may have associated game data that can be used to index, archive, and retrieve relevant video segments.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer readable medium may be transmitted using any appropriate medium, including but not limited to wireless, wireline, optical fiber cable, RF, etc., or any suitable combination of the foregoing.

Computer program code for may be written in any combination of one or more programming languages, including an object oriented programming language such as Java, Smalltalk, C++, or the like, and conventional procedural programming languages, such as the "C" programming language or similar programming languages. The program code may execute entirely on the computing unit.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

What is claimed is:

1. A method for indexing digital content, comprising:
transforming game data into a game-based organizing framework;
receiving a plurality of pieces of digital content from a plurality of sources;
identifying a respective time stamp associated with each piece of digital content, wherein each of the respective time stamps comprises a time of day at which a game event occurred;
associating the digital content together into groups based on the respective time stamps;
linking the digital content to the game-based organizing framework; and
providing access to an inter-game diachronic record including one or more of the pieces of digital content.

2. The method of claim 1, wherein the digital content includes images and video.

3. The method of claim 1, wherein the digital content relates to sporting events.

4. The method of claim 1, wherein the digital content is received at a cloud infrastructure over one or more network connections.

5. The method of claim 1, wherein the plurality of pieces of digital content comprise plays within a sporting event.

6. The method of claim 5, further comprising:
obtaining, for each of the plurality of pieces of digital content, game metadata describing the play;
indexing the game metadata into a database for each of the plurality of pieces of digital content; and
associating the digital content together based on the respective time stamps and the game metadata.

7. A system for indexing digital content, comprising:
one or more interfaces configured to receive a plurality of pieces of digital content from a plurality of sources over a network connection; and
one or more processors configured to:
transform game data into a game-based organizing framework;
identify a respective time stamp associated with each piece of digital content, wherein each of the respective time stamps comprises a time of day at which a game event occurred;
associate the digital content together into groups based on the respective time stamps;
link the digital content to the game-based organizing framework; and
provide access to an inter-game diachronic record including one or more of the pieces of digital content.

8. The system of claim 7, wherein the digital content includes images and video.

9. The system of claim 7, wherein the digital content relates to sporting events.

10. The system of claim 7, wherein the one or more interfaces and the one or more processors are provided in a cloud infrastructure.

11. The system of claim 7, wherein the plurality of pieces of digital content comprise plays within a sporting event.

12. The system of claim 7, wherein the one or more processors is further configured to:
obtain, for each of the plurality of pieces of digital content, game metadata describing the play;
index the game metadata into a database for each of the plurality of pieces of digital content; and
associate the digital content together based on the respective time stamps and the game metadata.

13. A non-transitory computer-readable medium comprising instructions which, when executed by a processor, perform a method comprising:
transforming game data into a game-based organizing framework;
receiving a plurality of pieces of digital content from a plurality of sources;
identifying a respective time stamp associated with each piece of digital content, wherein each of the respective time stamps comprises a time of day at which a game event occurred;
associating the digital content together into groups based on the respective time stamps;
linking the digital content to the game-based organizing framework; and
providing access to an inter-game diachronic record including one or more of the pieces of digital content.

14. The non-transitory computer-readable medium of claim 13, wherein the digital content includes images and video.

15. The non-transitory computer-readable medium of claim 13, wherein the digital content relates to sporting events.

16. The non-transitory computer-readable medium of claim 13, wherein the digital content is received at a cloud infrastructure over one or more network connections.

17. The non-transitory computer-readable medium of claim 13, wherein the plurality of pieces of digital content comprise plays within a sporting event.

18. The non-transitory computer-readable medium of claim 17, further comprising instructions which, when executed by the processor:
   obtain, for each of the plurality of pieces of digital content, game metadata describing the play;
   index the game metadata into a database for each of the plurality of pieces of digital content;
   associate the digital content together based on the respective time stamps and the game metadata.

19. The method of claim 1, wherein the game-based organizing framework is a time-location index of the game data.

* * * * *